UNITED STATES PATENT OFFICE.

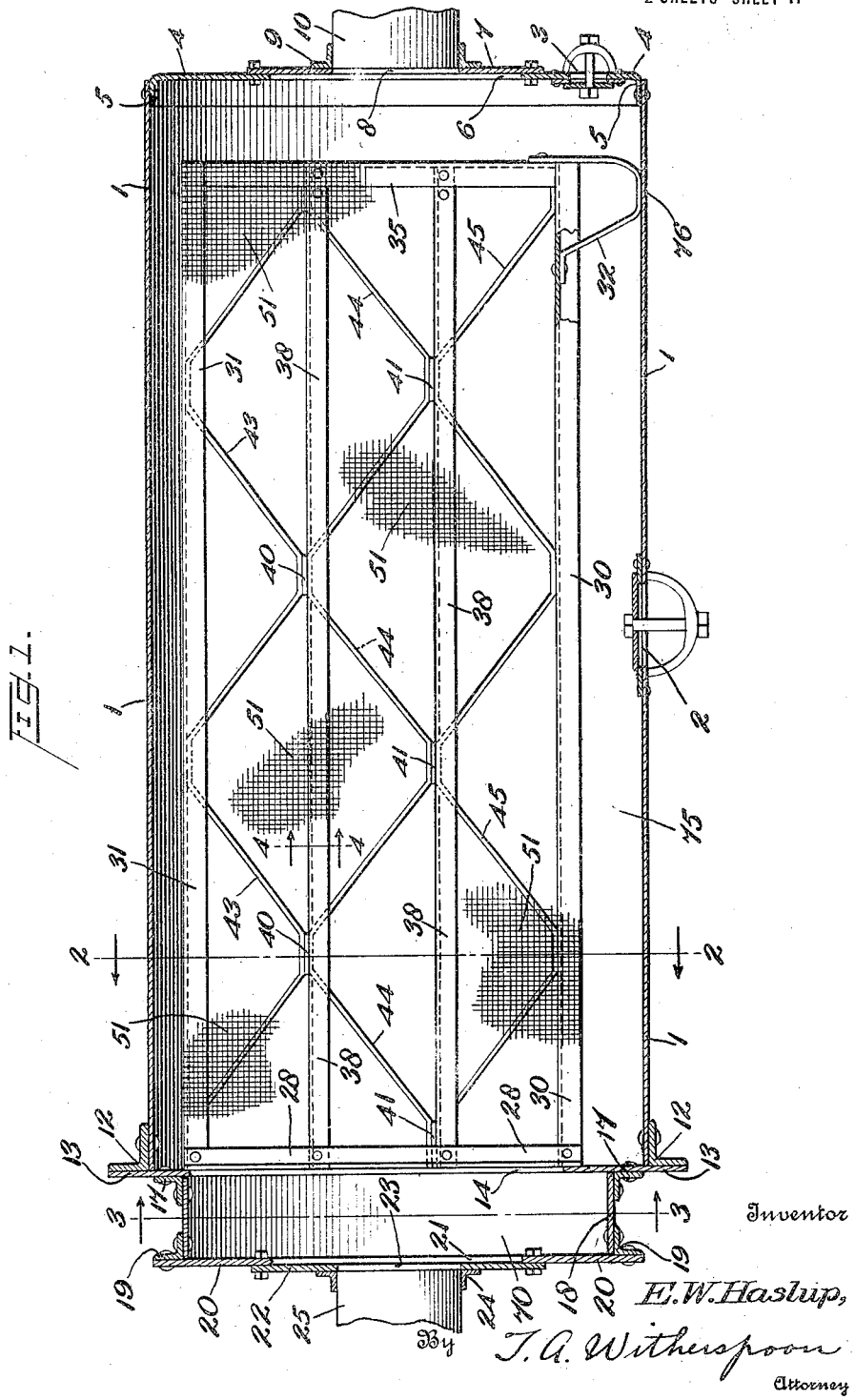
E. W. HASLUP.
METAL SCREEN OR SEPARATOR FOR GASES.
APPLICATION FILED DEC. 31, 1919.
1,382,975.
Patented June 28, 1921.
2 SHEETS—SHEET 1.
Inventor
E. W. Haslup,
By J. A. Witherspoon
Attorney

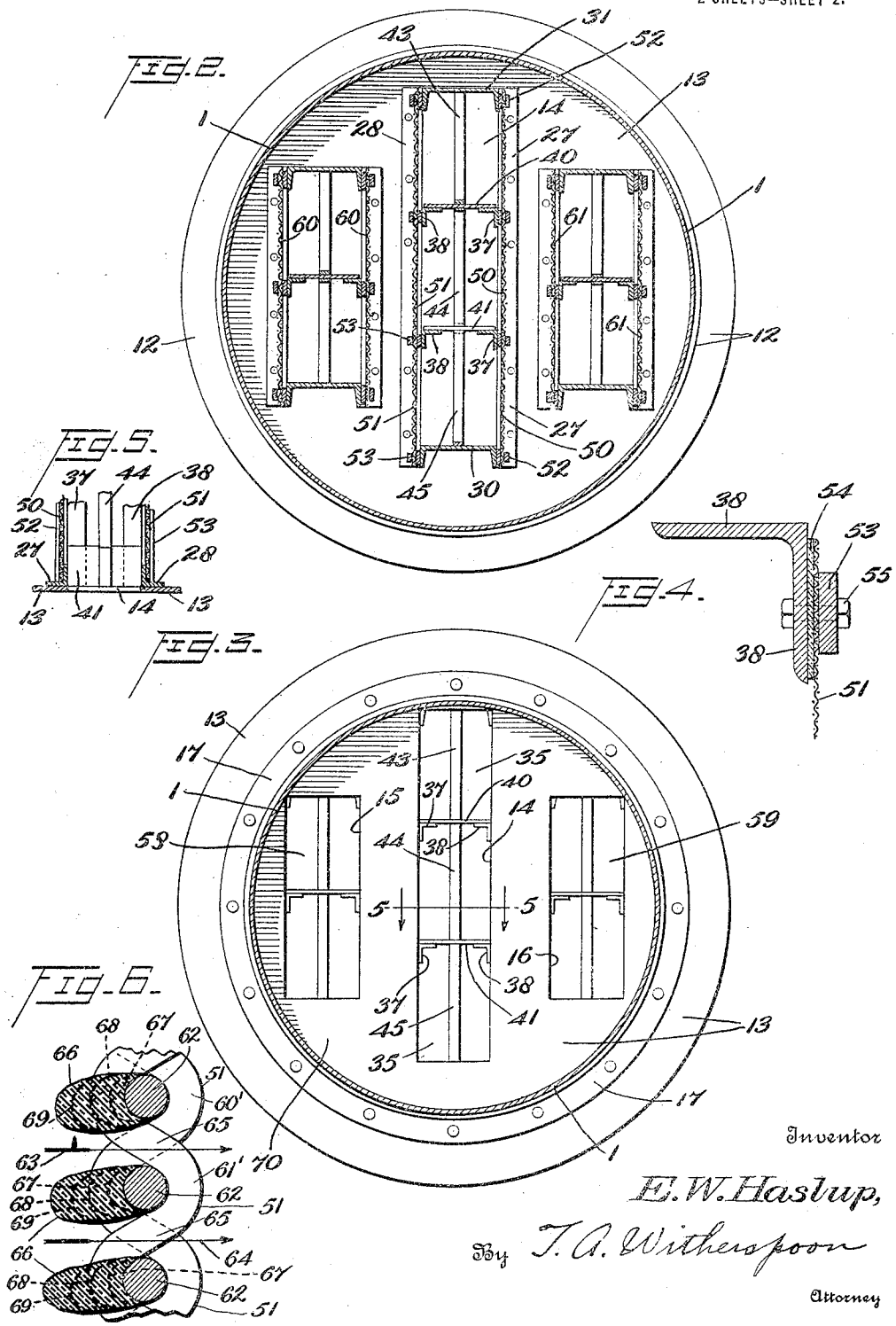

EDWARD W. HASLUP, OF BRONXVILLE, NEW YORK.

METAL SCREEN OR SEPARATOR FOR GASES.

1,382,975.  Specification of Letters Patent.  Patented June 28, 1921.

Application filed December 31, 1919. Serial No. 348,596.

*To all whom it may concern:*

Be it known that I, EDWARD W. HASLUP, a citizen of the United States, residing at Bronxville, in the county of Westchester and State of New York, have invented certain new and useful Improvements in Metal Screens or Separators for Gases; and I do hereby declare the following to be a full, clear, and exact description of the invention, such as will enable others skilled in the art to which it appertains to make and use the same.

This invention relates to metal screens or separators for gases, and has for its object to provide a device of this nature which will be simple in construction and more efficient in action than those which have been heretofore proposed.

With this and other objects in view the invention consists in the novel details of construction and combinations of parts more fully hereinafter disclosed and particularly pointed out in the claims.

Referring to the accompanying drawings forming a part of this specification, in which like numerals designate like parts in all the views:—

Figure 1 is a longitudinal sectional view of a screen separator made in accordance with this invention;

Fig. 2 is a transverse sectional view taken on the line 2—2 of Fig. 1;

Fig. 3 is a view similar to Fig. 2 taken on the line 3—3 of Fig. 1;

Fig. 4 is an enlarged detail sectional view taken on the line 4—4 of Fig. 1;

Fig. 5 is a detail sectional view taken on the line 5—5 of Fig. 3 looking in the direction of the arrows, and Fig. 6 is a sectional detail view illustrating the operation of this invention.

In order that the precise invention may be the more clearly understood it is said:—

In my Patent #1,310,478, dated July 22, 1919, and entitled Process of recovering fixed nitrogen, I have disclosed and claimed a process for recovering certain nitrogenous gases from blast furnaces, and these said gases carry comparatively large portions of solids as well as of combustible gases, such for example as CO or carbon monoxid.

In order to eliminate these solids cheaply and effectually from the nitrogenous gases and from the combustible gases, it requires a separator which will stand a high temperature and which will do its work continuously and in an efficient manner.

The apparatus I have found available for these separations are not satisfactory for that when they are made of a material having sufficient fine mesh to do the work, the said material is generally combustible, at the temperature of the gases, and therefore, it is not practicable to pass the hot combustible gases therethrough.

Further, the often red hot solids set fire to or destroy the combustible material of these said prior separators, and altogether, I have found it necessary to provide a special construction for this work. Further, it is very desirable to not have to cool the gases before separation, because I prefer to pass the hot combustible gases right into furnaces or engines on the spot, and thus save the heat already contained. Besides, it requires a less costly installation and it saves a great deal of time to make the separation while the gases are hot.

Accordingly, in carrying out this invention, I have provided the following construction, which is entirely made of metal and which can be mechanically tapped or struck as with a hammer which will shake off the adhering solids and keep the pores open at all times, when it is desired so to do.

Referring to the accompanying drawings, 1 indicates an outer drum of steel provided with a manhole 2 of the usual type of construction, on its side, and with other manholes such as 3 on its end. One end of the drum 1 is provided with the closure 4 having an inturned flange 5 and said closure is provided with an enlarged central opening 6 as shown.

Said opening 6 is covered by the disk like plate 7 which in turn is provided with a smaller opening 8 as will be clear from Fig. 1. Said smaller opening 8 is surrounded by the flanged ring member 9 into which fits the outlet pipe 10.

The other end of said drum 1 is provided with the flanged ring like member 12 against the flat surface of which fits the disk like closure 13 provided with the larger central rectangular opening 14 on each side of which said plate 13 also carries the smaller rectangular openings 15 and 16, as best shown in Fig. 3. Fitted on said plate 13, and outside the rectangular opening 13 is the ring like flanged member 17 to which is fitted the cylindrical member 18, likewise provided with the ring like flanged member 19 against which fits the plate or disk like closure 20 having the central opening 21, covered by the disk member 22, having the central opening 23 surrounded by the flanged ring like member 24 into which fits the inlet pipe 25 for the gases.

Inside the disk like closure 13, bordering the longer edges of the rectangular opening 14, are the angle plates 27 and 28 as best shown in Fig. 2. Fitted between one end of said plates 27 and 28 is the channel iron 30 and fitted between the other end of said plates 27 and 28 is the similar channel iron 31 thus forming a sort of rectangular frame.

These said channel irons 30 and 31 or frame work extend almost the entire length of the drum 1 as will be clear from Fig. 1, and at the end of said channel iron 30 farthest away from the plate 13 there is provided a support 32 resting upon the inside of said drum 1 as shown.

Extending above the support 32 and between the outer ends of the said channels 30 and 31 is the channel member 35 which closes the space between said channels 30 and 31 all as will be clear from Figs. 1 and 3.

On the inside surfaces of the angle irons 27 and 28 are respectively secured at one end the angle irons 37 and 38, which extend parallel to the channel plates 30 and 31, and whose other ends are secured to the channel plate 35 all as will be clear from Figs. 1 and 2.

Extending from the angle members 37 and 38 and across the space between the angle members 27 and 28 are the plates 40 and 41 which are only of a comparatively small width as best illustrated in Fig. 1, and to which are secured the bent bracing members 43 44 and 45, as illustrated. Each of said members 43, 44 and 45 are so fashioned and disposed that when secured in place they form a sort of hexagonal cylindrical brace structure which comprises great strength with a maximum of lightness as will be readily understood.

It will thus be seen that around the rectangular central opening 14 there is built a light strong well braced skeleton structure or frame which is open at one end and closed at the other. On the open sides of this rectangular construction are placed the wire gauze or perforated metal sheets 50 and 51 which are conveniently secured in place as by the battens 52 and 53 which are shown with greater particularity in Fig. 4. That is to say, between the angle irons 37 and 38 and said wire gauze or perforated metal members 50 there is placed asbestos strips 54 and bolts or other fastenings 55 are passed through the angles 37, the said strips 54, the wire gauze or perforated metal sheets 50 and the battens 52 which hold the parts firmly in position.

Surrounding the openings 15 and 16 in the closure plate 13 are structures precisely similar to that just described, and therefore, it is not deemed necessary to repeat such disclosure here.

Suffice it to say that said structures are open at one end to admit the gases and are closed at the other end as by the angle plates 58 and 59 which are not shown in detail but are only indicated in Fig. 3. These said plates 58 and 59 are of the precise construction of the plates 30 and 31, and 35, and only their vertical surfaces show in Fig. 3.

Further, applied to these said skeleton structures that are associated with the openings 15 and 16 are the wire gauze or, perforated metal sheets 60 and 61 to complete the entire filtering constructions that are duplicates of the filtering construction already described in connection with the opening 14.

The operation of this device will be readily understood from the foregoing but may be briefly summarized as follows:—Hot gases being admitted through the inlet pipe 25 they readily fill the space 70 between the plates 20 and 13, and find their way through the openings 14, 15 and 16 into the rectangular structures provided with the wire gauze or perforated metal sheets 50, 51, 60 and 61, and pass through said wire gauze, or perforated metal, sheets into the open space 75 on the inside of the drum 1, whence the filtered gases next pass out the exit pipe 10 in their hot condition. These said gases while still hot are conducted into a suitable furnace or heat engine.

In some cases and in fact, whenever it may be desired, the course of the gases may be reversed through this apparatus. That is, they may enter the pipe 10, traverse the various filter screens and pass out the pipe 25. The solids will collect in the open space 75 and those which stick to the wire gauze or perforated metal sheets such as 50, 51, 60 and 61 may be readily detached when desired by striking violently against the drum, especially on the outside thereof at or near the point 76 opposite the support 32 of the said wire gauze or perforated metal construction. These said solids may be removed from the space 75 by any suitable means. The construction being that of the well known boiler type is readily produced at any well equipped boiler making plant and is supported as any boiler would be.

An important feature of this invention resides in the fact that this filtering apparatus is made of a good heat conducting material, for I have discovered in using the same, that certain of the impurities in the gases will settle out in masses on the heat conducting foraminous filtering members, leaving clear passages for the gases through said masses and the said foraminous or reticulated members, with the result that said settled out masses serve to attract and hold other oncoming impurities even better than the original clean filtering surfaces of the members such as 50, 51, etc., could do.

A reference to Fig. 6 will render this action more clear. In said figure a portion of a foraminous diaphragm such as 51 is disclosed wherein 60', 61' and 62 indicate the wires of such a diaphragm and 63 and 64 indicate arrows showing the direction of travel of gases through the foraminous openings 65 of said diaphragm, and 66 indicates masses of impurities which collect upon the wires 62 as well as upon the wires 60' and 61'. The character of these said masses will depend of course upon the nature of the impurities. If these said masses are of a tarry nature they will of course settle out and cling to the said wires or walls of the passages 65 quite tenaciously whether their temperatures is lowered through the conduction of their heat by said wires or not. On the other hand, if the temperature of the gases is relatively high, which is the fact when blast furnace gases are dealt with, then some of the binding material which exists between the solids, carried by the gases will have a tendency to condense on said wires 62 and to hold the solids in said gases on said wires, with the result that a mixture of the hot solids and condensed binding material will collect first on said wires as indicated by the dotted lines 67 whereupon further oncoming solids and binding material will be attracted and held by the more or less sticky surfaces indicated by the said numeral 67 and thus the material separated out will grow on said surfaces 67 to form the additional surfaces indicated by the numeral 68. In like manner, the somewhat sticky surfaces 68 will be added to by the oncoming material as indicated by the surfaces 69, and so on, resulting in a steady separation of the solids from the gases to the end that the gases will be much more effectually cleaned of their impurities than would be the case if no such masses such as 66 had been deposited on the wires 62. Accordingly, in operating this filtering apparatus instead of continuously cleaning the porous surfaces as has been customary heretofore, I avoid cleaning them as much as possible, because I find that the masses 66 constitute a much better filtering surface than does the clean metal itself. In fact, when I am going to filter furnace gases, I do not employ my surfaces clean but I may pass over said surfaces gases that are well filled with tarry matter such for example as the gases which come from a coal fire. The effect of this treatment is to coat the wires or heat conducting metallic, or other surfaces, with a sticky substance which will readily bind and firmly hold the hot finely divided solids that are plentifully present in furnace gases.

These solids as is well known are in the nature of oxids, sulfids, etc., and give great trouble in ordinary filters. I have found in actual practice that when my filtering surfaces are employed in the manner just disclosed, very little cleaning is required at all, because so great is the accumulation of these masses, that they fall off automatically themselves when they get too heavy, and before the passages such as 65 become clogged. Stated in still other language, the velocity of the gases through said passages 65 is sufficiently great to keep the passages open for the purpose of making a relatively clean separation and the heat that is present in said gases serves to render the masses such as 66, exceedingly porous and to actually constitute such masses themselves a valuable filtering material.

The relatively high temperature of furnace gases I find is not essential to the successful operation of this filter, because I find that temperatures much lower than that accompanying furnace gases will serve to render this filtering action very efficient provided of course the materials carried by the gases are of such a nature as will readily condense on the wires and will be of such a nature when condensed as to not clog the pores. Such materials are those which generally accompany the combustion of coal whether it be in a blast furnace or in other furnaces, or in other metallurgical operations.

It is obvious that those skilled in the art may vary the details of the construction as well as the arrangement of parts without departing from the spirit of the invention, and therefore, I do not wish to be limited to the above disclosure except as may be required by the claims.

What I claim is:—

1. In a separator for gases the combination of a drum; a closure plate for the inlet end of said drum provided with a plurality of inlet openings; a frame work surrounding each opening and disposed longitudinally of said drum; foraminous filtering screens of heat conducting material and having substantially vertical side walls secured to each of said frame works, said screens spaced from said drum and from each other throughout their extent to provide a space into which the gases may expand; a closure for the exit end of said drum; an exit pipe common to all of said screens to convey away the filtered gases; and an inlet pipe materially smaller in cross section than said drum common to all of said openings and adapted to lead gases to be filtered to said screen, substantially as described.

2. In a separator for hot gases the combination of a metal drum; a metal closure plate inside said drum forming an inlet chamber and provided with a plurality of inlet openings; a metal frame work surrounding each opening disposed longitudinally of said drum; rigid metal foraminous filtering screens secured to said frame work and spaced from said drums and from each other throughout their extent to form a space into which the hot gases may expand; a metal support extending from said frame work to the inside wall of said drum; an exit pipe communicating with said space to convey away the filtered hot gases; and an inlet pipe leading to said chamber to lead the gases to be filtered to said openings, substantially as described.

3. In a separator for hot gases the combination of a drum provided with a manhole; a closure plate on the inlet end of said drum provided with a plurality of rectangular openings; a drum like structure secured to said closure plate and inclosing said opening; an inlet pipe leading into said drum like structure; a rectangular skeleton filtering structure surrounding each of said rectangular openings separated from each other and extending lengthwise of said drum; means for supporting each frame free from the inside of said drum; rigid foraminous material covering the sides of each of said skeleton structures; a closure for the exit end of said drum; and an exit pipe for the hot gases piercing said closure, substantially as described.

4. In a separator for hot gases, the combination of a drum provided with a manhole; a closure plate on the inlet end of said drum provided with a plurality of rectangular openings; a drum like structure secured to said closure plate and inclosing said openings; an inlet pipe leading into said drum like structure; a rectangular skeleton filtering structure provided with top, bottom and end channel members closing the top, bottom and end sides of each structure, said structures surrounding each of said rectangular openings, extending lengthwise of said drum, and provided with means supporting it free from the inside of said drum; wire cloth material covering the sides of each of said skeleton structures; longitudinally disposed angle members located on the sides of said skeleton structures with bent bracing members located between said angle members to stiffen the latter and aid in supporting said wire cloth material; a closure for the exit end of said drum; and an exit pipe for the hot gases piercing said closure, substantially as described.

5. In a separator for hot gases the combination of a drum provided with a manhole; a closure plate on the inlet end of said drum provided with a plurality of rectangular openings; a drum like structure secured to said closure plate and inclosing said openings; an inlet pipe leading into said drum like structure; a rectangular skeleton filtering structure provided with top, bottom and end channel members closing the top, bottom and end sides of each structure, said structures surrounding each of said rectangular openings, extending lengthwise of said drum, and provided with means supporting it free from the inside of said drum; wire cloth material covering the sides of each of said skeleton structures; longitudinally disposed angle members located on the sides of said skeleton structures with bent bracing members located between said angle members to stiffen the latter and aid in supporting said wire cloth material; a closure for the exit end of said drum; and an exit pipe for the hot gases piercing said closure, substantially as described.

In testimony whereof I affix my signature.

EDWARD W. HASLUP.